Dec. 30, 1952

W. F. DITOLLA 2,623,626

DEVICE FOR TRANSFERRING ARTICLES FROM
ONE CONVEYER TO ANOTHER CONVEYER

Filed March 30, 1950

INVENTOR
William F. Ditolla
By [signature]
ATTORNEYS

Patented Dec. 30, 1952

2,623,626

UNITED STATES PATENT OFFICE 2,623,626

DEVICE FOR TRANSFERRING ARTICLES FROM ONE CONVEYER TO ANOTHER CONVEYER

William F. Ditolla, Hicksville, N. Y., assignor to Gifford-Wood Company, Hudson, N. Y., a corporation of New York Application March 30, 1950, Serial No. 152,813

15 Claims. (Cl. 198—21)

My invention relates to conveyers and particularly to a device for automatically removing articles from one conveyer and carrying them to and depositing them upon another conveyer. More specifically, the device is designed to effect an automatic transfer of trays or packages of uniform size from the discharge end of one conveyer to the loading end of a second conveyer which is disposed in spaced relation to and runs in a direction opposite that in which the first conveyer runs.

In plants where food products are frozen by carrying them on conveyers through tunnels in which a very low temperature is maintained, my device may be used in transferring such products from the discharge end of one conveyer to the receiving end of another conveyer. The device may also be used in manufacturing plants where parts are carried on conveyers through drying ovens after they have been spray painted. The use of multiple conveyers reduces the length of the freezing tunnels or the drying ovens which otherwise would be required.

The principal object of my invention is to provide a device for automatically transferring articles from one conveyer to another. I accomplish this and other objects, which will be apparent as the description proceeds, by means of the novel combinations and arrangements of elements described below and illustrated in the accompanying drawing in which—

Fig. 3 is a wiring diagram.

Referring to the drawings—

Figure 1:
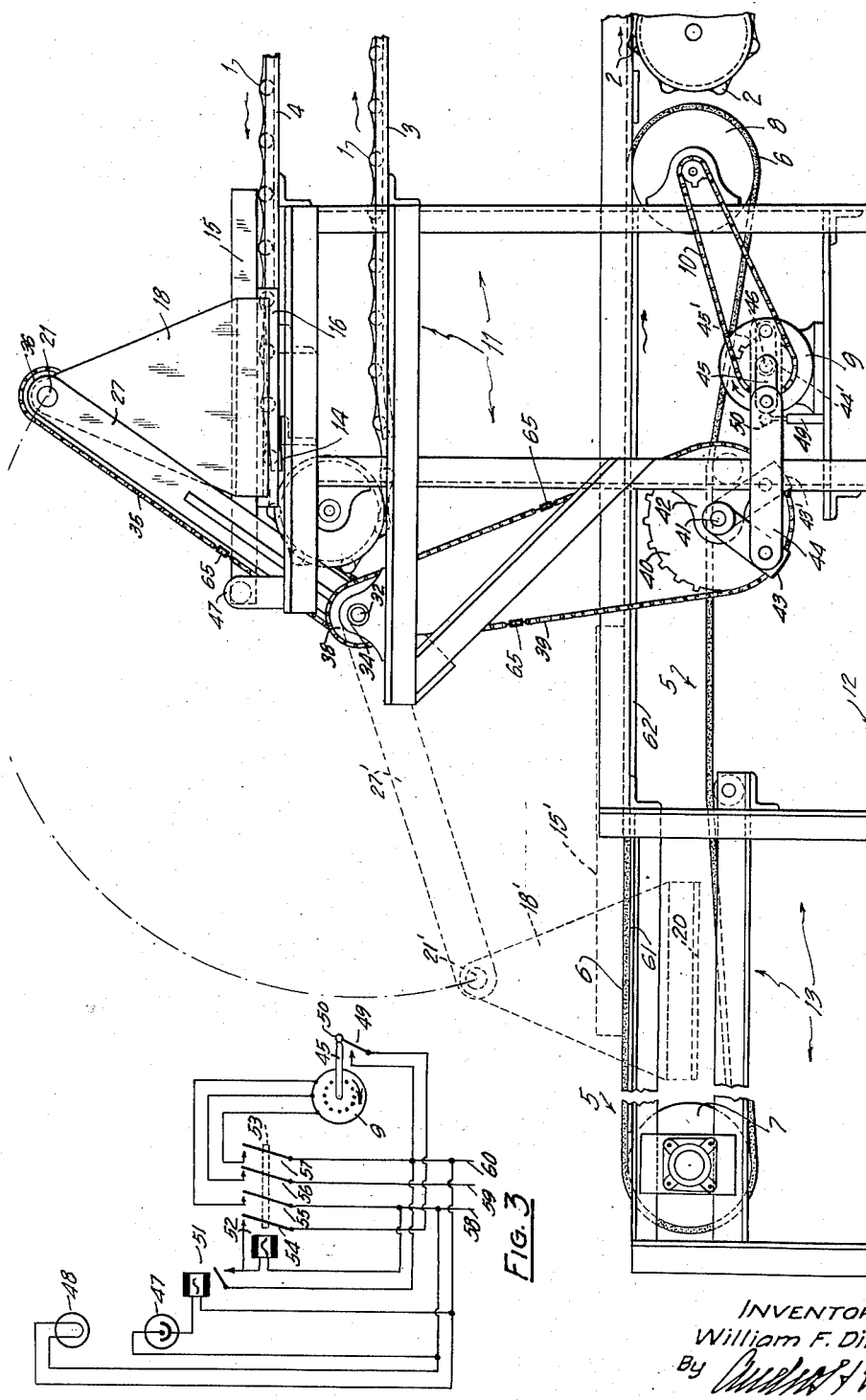
Fig. 1 is a side elevation view of my device.

1 represents the first conveyer, which is driven in the direction of the arrows adjacent thereto from a source of power not shown. 2 is a second conveyer, which is below and in spaced relation to the first conveyer, and which runs in the direction of the adjacent arrow which is opposite the direction in which the first conveyer is driven. Each of these conveyers as illustrated, comprises two chains (see also Fig. 2) which slide on supports, such as the angles 3 and 4 shown in connection with the first conveyer in Fig. 1.

Disposed in cooperative relation to the second conveyer, to transfer articles deposited thereon to said second conveyer, is a third conveyer, represented generally by the numeral 5, and illustrated as a belt 6 which runs over pulleys 7 and 8 mounted in suitable bearings, and one of which is driven by the motor 9 through the chain 10.

My transfer mechanism, which will be described below, lifts the articles from the first conveyer and deposits them on the third conveyer which transfers them to the second conveyer.

My transfer device is mounted on a suitable frame, represented generally by the numeral 11, which is illustrated as formed of angles which may be welded, riveted or otherwise secured together. The third conveyer is supported on the floor 12 by suitable framing represented generally by the numeral 13 and runs beneath the discharge end of the first conveyer and between the vertical supporting legs of the frame 11, as shown in Fig. 2.

The angles 4, in which the upper run of the conveyer 1 is supported, are substantially horizontal in the zone where they approach the transfer mechanism, but are bent down slightly, as shown at 14 in Fig. 1 so that the top of the upper run of the conveyer drops slightly in the zone adjacent the discharge end thereof.

Figure 2:
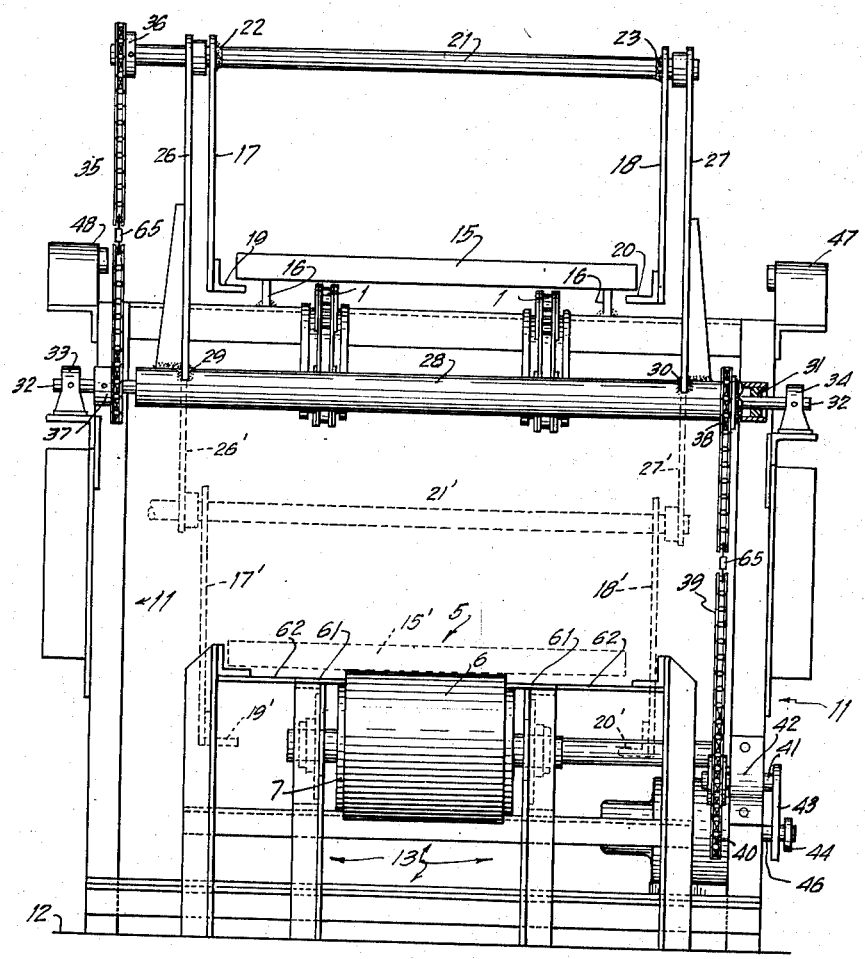
Fig. 2 is a left hand side or end view with portions broken away.

The articles which my mechanism transfers from the first conveyer to the second are illustrated as trays 15, which project beyond the sides of the conveyer 1, as shown in Fig. 2, and in which the articles to be frozen or dried are carried, but it is to be understood that other articles which project beyond the sides of the conveyer may be handled by the transfer mechanism. The reason why the discharge end of the first conveyer is slightly lowered is to allow the trays 15 carried thereby to be slid by the conveyer on to the bars 16 (see also Fig. 2) and stopped in the position shown in Figs. 1 and 2 out of contact with the conveyer chains, or at least out of such contact therewith as will move them further along than the position shown in Fig. 1.

In order to pick up the trays resting on the bars 16, I provide a pair of fingers 17 and 18 having inturned portions 19 and 20 at their lower ends which project beneath the opposite sides of the trays 15. The fingers 17 and 18 depend from a shaft 21 to which they are welded or otherwise fixed, as shown at 22 and 23. This shaft is rotatably mounted in bearings 24 and 25 which are secured to the arms 26 and 27. Thus, it may be said that the fingers 17 and 18 are astraddle the conveyer 1 when in the position shown in solid outlines in Figs. 1 and 2. The lower ends of the arms 26 and 27 are welded to a cylindrical sleeve 28, as shown at 29 and 30. The sleeve 28 is provided, at its ends, with bearings, one of which is shown at 31 at the right hand side of Fig. 2, and which are rotatable on a stationary shaft 32 which is pinned or otherwise fixed in the supports 33 and 34. For a purpose which will be described below, the shaft 21, which may rotate, and the shaft 32, which is fixed, are connected together by the chain 35 which runs between a sprocket 36, fixed to the shaft 21, and a stationary sprocket 37 which is fixed to the shaft 32.

In order to swing the shaft 21 with the dependent fingers 17 and 18 from the position shown in solid outline in Figs. 1 and 2 to the position shown in dotted outline in these figures, which last position is astraddle the belt 6 of the third conveyer, as shown in Fig. 2, a sprocket 38 is fixed to the sleeve 28 and is connected by means of a chain 39 to a sprocket 40 which is mounted on a short shaft 41 which oscillates in the bearing 42. The shaft 41 to which the sprocket 40 is affixed is provided with a depending crank arm 43, and this arm, in turn, is pivotally connected to one end of the link 44. The link 44, at its other end is pivotally connected to the crank 45 on the shaft 46. The shaft 46 is to be understood as being driven by the motor 9 through a speed reducing device, not shown, so that the shaft 46 turns at a very much lower speed than the motor.

In order to start the motor 9, I provide a photoelectric cell 47 and a source of light 48 which normally projects a beam of light on said cell across the path of the trays 15 when they are moved into the position shown in Figs. 1 and 2. When a tray reaches the position shown in solid outline in Fig. 1, the beam of light is intercepted which effects a starting of the motor 9, as will be described below, to make one complete rotation of the shaft 46. When the crank 45 on shaft 46 has turned 180° to the position shown at 45' in Fig. 1, the shaft 21 from which the fingers 17 and 18 are suspended, is swung to the position 21' with the fingers astraddle the belt 6, and the inturned portions thereof substantially below the level of the top of said belt. As the inturned portions 19 and 20 of the fingers pass below the level of the top of the belt 6 which is moving in the direction of the arrow over the slide plates 61 and 62 and driven by the motor 9, the tray 15 is deposited thereon and is immediately carried to the right towards the second conveyer. The rate of speed at which the belt 6 travels is sufficient to move the tray, shown at 15' thereon, out of the path of movement of the inturned portions of the fingers as they are swung back to their initial position while the crank 45 is turning through the remaining 180° to complete one cycle of movement thereof. In order to stop the motor when the fingers have returned to their normal position, shown in solid outline in Figs. 1 and 2, I provide a limit switch 49 having an actuating member 50 with which the end of the crank contacts, as shown in Fig. 1, to effect an opening of the limit switch which breaks the motor circuit and stops the motor. In order to prevent an overrunning of the motor after the limit switch has opened, the motor is provided with a brake, not shown. When the next tray 15 cuts off the beam of light on the photoelectric cell, the operation is repeated and the trays on the belt 6 are moved to the right and finally slid on to the second conveyer.

In Fig. 3, I have shown a wiring diagram illustrating how the photoelectric cell functions to start the motor and how the limit switch stops the motor. In this figure, 47 is the photoelectric cell and 48 is the source of light which projects the beam on the photoelectric cell across the path of the trays as they reach the end of their travel on the first conveyer. 51 is a relay which, so long as the beam of light strikes the photoelectric cell, is open. When the beam of light is intercepted by a tray in a position to be picked up by the fingers, the relay 51 is de-energized and the switch closes which energizes the relay 52. The armature 53 of relay 52 is connected to the switches 54, 55, 56 and 57, and these switches close when relay 54 is energized. The motor 9 is shown as a three phase motor, and the power lines are shown at 58, 59 and 60. The closing of the switch controlled by relay 51 establishes a circuit from power line 58 through the relay 52 and back to power line 60, and the closing of the switch 55 establishes a circuit through the relay 52 to the same power lines but through limit switch 49 which is then closed. This last circuit is necessary because as soon as the tray 15 is raised by the fingers 17 and 18 so that it no longer intercepts the beam of light, the relay 51 is energized and its switch opens. If it were not for the closed limit switch which holds the switches 54, 55, 56 and 57 closed, these last four switches would open and the motor would stop. However, the closing of the switch 54 holds this switch and switches 55, 56, and 57 closed so long as the switch 49 is closed. Thus, the motor 9 continues to turn the crank 45 through the gear reduction mechanism in the direction of the arrow shown in Fig. 3, until the crank 45 pushes the limit switch 49 open again, whereupon the motor is stopped and the fingers 17 and 18 are back in their normal position ready to pick up the next tray when the motor is again started.

In order positively to maintain the inturned portions 19 and 20 of the fingers 17 and 18, and a pan supported thereby horizontal, as the pan is swung from the first conveyer to the third conveyer, the chain 35 and the sprockets 36 and 37 are provided. Since the sprocket 37 is stationary but is on the axis of shaft 32 about which shaft 21 having sprocket 36 thereon is swung, the sprocket 36 will turn but the chain 35 will simply unwrap itself from one side of the sprocket 37 and wrap itself around the opposite side thereof so that the inturned portions 19 and 20 of the fingers always remain horizontal.

In order to eliminate any lost motion in the transfer mechanism, due to slack in the chains 35 and 39, and to adjust and maintain in adjustment the relative positions of the transfer mechanism and the driving mechanism so that they will move in precisely timed relation, each run of the chains 35 and 39 is provided with a turnbuckle 65 for adjusting the length thereof.

While I have described my invention in its preferred embodiment, it is to be understood that the words which I have used are words of description rather than of limitation and that changes, within the purview of the appended claims, may be made without departing from the true scope and spirit of my invention in its broader aspects.

What I claim is:

1. A device for transferring articles from a first conveyer to a second conveyer disposed in spaced relation to said first conveyer; said device comprising a pair of opposed fingers spaced to straddle said first conveyer for picking up an article projecting laterally therefrom; a conveyer separate from said first and second conveyers but disposed to convey articles thereon to, and deposit them upon, said second conveyer; means normally disposed above said first conveyer pendulously supporting said fingers astraddle said first conveyer; a shaft rotatably mounted in fixed bearings below and carrying said fingers, and about the axis of which said fingers may be swung into a position astraddle said separate conveyer, for picking up articles from said first conveyer and carrying them to and depositing them on said separate conveyer; means for swinging said fingers between said positions; and means actuated by an article on said first conveyer, when said article is moved thereby into a position to be picked up by said fingers, for putting said swinging means into operation.

2. The structure set forth in claim 1 in which said second conveyer is disposed underneath and substantially parallel to said first conveyer.

3. The structure set forth in claim 1 in which said second conveyer runs in a direction opposite said first conveyer.

4. A device for transferring articles from a first conveyer to a second conveyer disposed in spaced relation to said first conveyer; said device comprising a pair of opposed fingers spaced to straddle said first conveyer for picking up an article projecting laterally therefrom; a conveyer separate from said first and second conveyers but disposed to convey articles thereon to, and deposit them upon, said second conveyer; a first shaft normally disposed above said first conveyer and from which said fingers are fixedly suspended; a second shaft rotatably mounted in fixed bearings below said first shaft and carrying bearings in which said first shaft is rotatably mounted; a motor for oscillating said second shaft between a position in which said fingers are astraddle said first conveyer and a position in which they are astraddle said separate conveyer; means cooperating with said first shaft for preventing rotation thereof and a swinging of said fingers about the axis of said first shaft during an oscillating movement of said second shaft; and means actuated by an article on said first conveyer, when said article is moved thereby into a position to be picked up by said fingers, for putting said motor into operation.

5. The structure set forth in claim 4 together with means for automatically stopping said motor after each complete operating cycle of said device.

6. The structure set forth in claim 4 in which said second conveyer is disposed underneath and substantially parallel to said first conveyer.

7. The structure set forth in claim 4 in which said second conveyer runs in a direction opposite said first conveyer.

8. A device for transferring articles from a first conveyer to a second conveyer disposed in vertically-spaced relation to said first conveyer; said device comprising a third conveyer disposed to convey articles placed thereon to, and deposit them upon, said second conveyer; a pair of opposed fingers normally disposed astraddle said first conveyer and having inturned portions disposed below the top of said first conveyer adapted, when said fingers are raised, to engage and lift an article on and projecting laterally from said first conveyer; a mounting for said fingers, including a first shaft normally disposed above said first conveyer from which said fingers are suspended, and a second shaft about the axis of which said first shaft and said fingers may be swung first, to lift an article from said first conveyer, and thereafter to a position astraddle said third conveyer with the inturned portions thereof below the top of said third conveyer to deposit said article on said third conveyer; a motor for driving said shaft; and means actuated by an article on said first conveyer, when carried thereby into a position to be lifted therefrom by said fingers, for putting said motor into operation.

9. The structure set forth in claim 8 together with means for automatically stopping said motor after each complete operating cycle of said device.

10. The structure set forth in claim 8 in which said second conveyer is disposed underneath and substantially parallel to said first conveyer.

11. The structure set forth in claim 8 in which said second conveyer runs in a direction opposite said first conveyer.

12. A device of the character described for transferring articles from a first conveyer to a second conveyer disposed in spaced relation thereto, and on which said articles project laterally beyond said first conveyer; the combination with a third conveyer positioned to convey said articles when placed thereon to said second conveyer; of a pair of spaced fingers normally astraddle said first conveyer and having opposed inturned portions normally disposed below the top of said first conveyer but adapted to engage the laterally projecting portions of one of said articles and lift said articles from said first conveyer when said fingers are raised; a pair of vertically and laterally spaced, parallel-disposed, horizontal shafts; means connecting said shafts together and bearings for the lower of said shafts about the axis of which said connecting means and said upper shaft may be swung; the upper of said shafts being normally disposed over said first conveyer in a zone adjacent the end thereof, and said fingers being suspended therefrom; means, including a motor, for swinging said connecting means and said upper shaft, with said fingers, about the axis of said lower shaft to a position in which said fingers are astraddle said third conveyer with the inturned portions thereof below the top of said third conveyer, whereby to lift an article from said first conveyer and deposit it on said third conveyer, and thereafter swinging said connecting means, said upper shaft, and said fingers back to their normal position; and means, including said motor, for driving said third conveyer at a speed to carry an article deposited thereon out of the path of movement of said fingers as they are swung back to their normal position.

13. The structure set forth in claim 12 together with means for automatically stopping said motor when said fingers have returned to their normal position.

14. The structure set forth in claim 12 together with means, actuated by an article on said first conveyer when said article is moved into a position to be lifted therefrom by said fingers, for starting said motor.

15. The structure set forth in claim 12 together with means, actuated by an article on said first conveyer when said article is moved into a position to be lifted therefrom by said fingers, for starting said motor; and means for automatically stopping said motor when said fingers have returned to their normal position.

WILLIAM F. DITOLLA.

REFERENCES CITED

The following references are of record in the file of this patent:

UNITED STATES PATENTS

| Number | Name | Date |
| --- | --- | --- |
| 1,602,719 | Straight | Oct. 12, 1926 |
| 1,954,278 | Adams | Apr. 10, 1934 |
| 1,964,085 | Schmitt | June 26, 1934 |
| 2,344,667 | Arelt | Mar. 21, 1944 |
| 2,392,523 | Cramer | Jan. 8, 1946 |